(12) United States Patent
Debout et al.

(10) Patent No.: US 9,152,576 B2
(45) Date of Patent: Oct. 6, 2015

(54) MODE-BASED SECURE MICROCONTROLLER

(75) Inventors: Vincent Debout, La Ciotat (FR); Frank Lhermet, Roquevaire (FR); Alain-Christophe Rollet, La Ciotat (FR)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 13/597,030

(22) Filed: Aug. 28, 2012
(Under 37 CFR 1.47)

(65) Prior Publication Data

US 2014/0101459 A1    Apr. 10, 2014

(51) Int. Cl.
| | |
|---|---|
| *G06F 12/06* | (2006.01) |
| *G06F 12/14* | (2006.01) |
| *G06F 21/60* | (2013.01) |
| *G06F 21/72* | (2013.01) |
| *G06F 21/79* | (2013.01) |
| *G06F 3/06* | (2006.01) |
| *G06F 12/10* | (2006.01) |
| *H04L 29/06* | (2006.01) |

(52) U.S. Cl.
CPC ............ *G06F 12/1408* (2013.01); *G06F 3/067* (2013.01); *G06F 3/0619* (2013.01); *G06F 3/0644* (2013.01); *G06F 12/145* (2013.01); *G06F 21/606* (2013.01); *G06F 21/72* (2013.01); *G06F 21/79* (2013.01); *G06F 2221/2107* (2013.01); *H04L 63/0485* (2013.01)

(58) Field of Classification Search
CPC .............................. G06F 12/0292; G06F 12/10
See application file for complete search history.

(56) References Cited

U.S. PATENT DOCUMENTS

| 6,412,055 | B2 * | 6/2002 | Tallo et al. ..................... 711/173 |
| 2003/0177331 | A1 * | 9/2003 | Yamauchi ..................... 711/203 |
| 2007/0198804 | A1 * | 8/2007 | Moyer ........................... 711/202 |
| 2009/0043984 | A1 * | 2/2009 | Chang et al. .................. 711/173 |
| 2010/0250891 | A1 * | 9/2010 | Shalev et al. ................. 711/171 |

FOREIGN PATENT DOCUMENTS

EP    1801725 A2    6/2007

OTHER PUBLICATIONS

French Patent Office Search Report and Written Opinion, issued for priority application 1157656. Search report mailed on May 10, 2012, 7 pages.

* cited by examiner

*Primary Examiner* — Venkat Perungavoor
(74) *Attorney, Agent, or Firm* — North Weber & Baugh LLP

(57) ABSTRACT

Various embodiments of the present invention are related to integrated circuits for processing data at a microcontroller interface. The microcontroller interfaces to a memory. The method is employed to process input data provided by the microcontroller during a memory write operation, or input data extracted from the memory during a memory read operation, respectively. A write/read control is used to indicate the memory write or read operation, and a logic address is translated to at least one physical address in the memory. The write/read control and the logic address are further employed to determine a data process mode. In various data processing modes, the input data are processed according to at least one of a plurality of data processing methods to result in processed data in different data formats. Data in different formats may be stored in various regions of the memory.

20 Claims, 5 Drawing Sheets

MODE-BASED SECURE MICROCONTROLLER

CROSS REFERENCE TO RELATED APPLICATION

The application claims the priority of a French Patent Application No. 11 57656, entitled "A Mode-Based Secure Microcontroller," filed on Aug. 30, 2011, the subject matter of which is incorporated herein by reference.

BACKGROUND

A. Technical Field

The present invention relates to the field of integrated circuit, and more particularly, to systems, devices and methods of programming a data path of a microcontroller by selecting at least one of a plurality of data processing modes to process (e.g., encrypt, decrypt, format, etc.) data in the data path.

B. Background of the Invention

A microcontroller is normally a single integrated circuit comprising a central processing unit (CPU) core, memory, and input/output (I/O) peripherals. The CPU core ranges from simple 3-bit processors to complex 22-bit or 54-bit processors. A commonly used 8051-compatible microcontroller is based on an 8-bit CPU core. The I/O peripherals are used to interface the microcontroller with standard I/O devices, such as sensors and liquid crystal displays (LCD), and serial communication interfaces are normally used in the I/O peripherals. The memory in the microcontroller includes non-volatile random access memory (RAM) and read-only memory (ROM) for storing data and programs, respectively. The microcontroller architecture may vary to include more CPU cores, memory or I/O functions for various applications.

A secure microcontroller is used for applications that involve trusted operations on valuable assets in an insecure environment where a thief or hacker may gain access to processor cores, memory devices or I/O peripherals that are used to communicate and process sensitive data. This sensitive data may include account numbers, access codes, financial transactions/balances, rights management, metering (e.g., energy, units), program algorithms and other information. The secure microcontroller uses non-volatile RAM, e.g., a flash memory, rather than ROM for program storage, and additional enhanced security features are employed to avoid unauthorized accesses. To date, the secure microcontroller has been applied in a wide range of security-critical applications such as electronic banking, commercial transactions, and pay-TV access control, or any application that requires the protection of proprietary software and methods.

Since programs and data may be stored in an external memory of the secure microcontroller, data security and data integrity are two distinct threats that the external memory of a secure microcontroller should address. The first threat is sensitive information disclosure (i.e., data security) where confidential data is revealed and weakness in a program is exposed. The second threat is modification of application behavior (i.e., data integrity) which involves programs and data being modified in the external memory and results in a data integrity issue.

The secure microcontroller is designed to offer a level of security to data stored in the external memory. For instance, physical security is established against probing, and one example is the use of an anti-tampering enclosure. This solution may be expensive and does not cover new attack methods based on fault injection from power supply glitch, light, synchronous or asynchronous laser, or radioactive particles. The security features may also comprise memory encryption where data and addresses stored in the memory are encrypted or decrypted during the data exchanging process. As a result, the physical security perimeter can be limited to the microcontroller while the external memory and their communication buses can remain exposed physically.

Data integrity control is implemented for the programs and data stored in the external memory. Data integrity control is used to detect any willing or unwilling corruption between what was sent for writing to the memory by the microcontroller and what was stored in the memory. FIG. 1 illustrates a secure microcontroller 102 interfacing with an external memory 104 where the aforementioned data security and data integrity concerns are considered. The secure microcontroller 102 comprises a CPU core 106, an encryption and integrity protection block 108, a memory controller 110, a key storage 112 and buses for data, addresses and keys. Methods for integrity check, data encryption or data decryption are incorporated in the encryption and integrity protection block 108. During memory write or read cycles, the block 108 encrypts data from the CPU core 106 to payload data for storing in the memory 104, or decrypts payload data from the memory 104 to data subsequently received by the CPU core 106, respectively.

SUMMARY OF THE INVENTION

Various embodiments of the present invention are related to integrated circuits for processing data at a microcontroller interface, and more particularly to systems, devices and methods of programming a data path at the microcontroller interface by selecting at least one of a plurality of data processing modes to process (e.g., encrypt, decrypt, format, etc.) data in the data path. The method is employed to process input data provided by the microcontroller during a memory write operation, or input data extracted from the memory during a memory read operation, respectively. A write/read control is used to indicate the memory write or read operation, and a logic address is translated to at least one physical address in the memory. The write/read control and the logic address are further employed to determine a mode control signal indicating a data process mode. In various data processing modes, the input data is processed according to at least one of a plurality of data processing methods to result in processed data in different data formats.

A mode-based data processing system is used as a dedicated hardware unit at an interface between a microcontroller and a memory. The mode-based data processing system comprises an address translator, a mode generator, and a multi-mode data processing unit. The address translator translates the input address to at least one physical address in the memory. The mode generator is coupled to receive the input address and a write/read control and generates a mode control signal associated with a data processing mode. The multi-mode data processing unit generates at least one processed data according to the data processing mode.

A multi-mode data processing unit is employed at an interface between a microcontroller and a memory to implement mode-based data processing. The multi-mode data processing unit comprises a first demultiplexer, a second demultiplexer, a plurality of data processing units, a first multiplexer and a second multiplexer. Some data processing units are employed with the first demultiplexer and multiplexer to process (e.g., encrypt, format) input data from the microcontroller during memory write cycles. Some data processing units are employed with the second multiplexer and demultiplexer to process (e.g., decrypt, reformat) input data from the memory during memory read cycles.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 illustrates a secure microcontroller interfacing with an external memory where security and integrity concerns are considered.

DETAILED DESCRIPTION OF THE PREFERRED EMBODIMENTS

Various embodiments of the present invention are related to integrated circuits for processing data at a microcontroller interface, and more particularly to systems, devices and methods of programming a data path at the microcontroller interface by selecting at least one of a plurality of data processing modes to process (e.g., encrypt, decrypt, format, etc.) data in the data path. In certain embodiments, these mode-based data processing devices and systems are dedicated hardware units placed at an interface between the microcontroller and a memory. In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
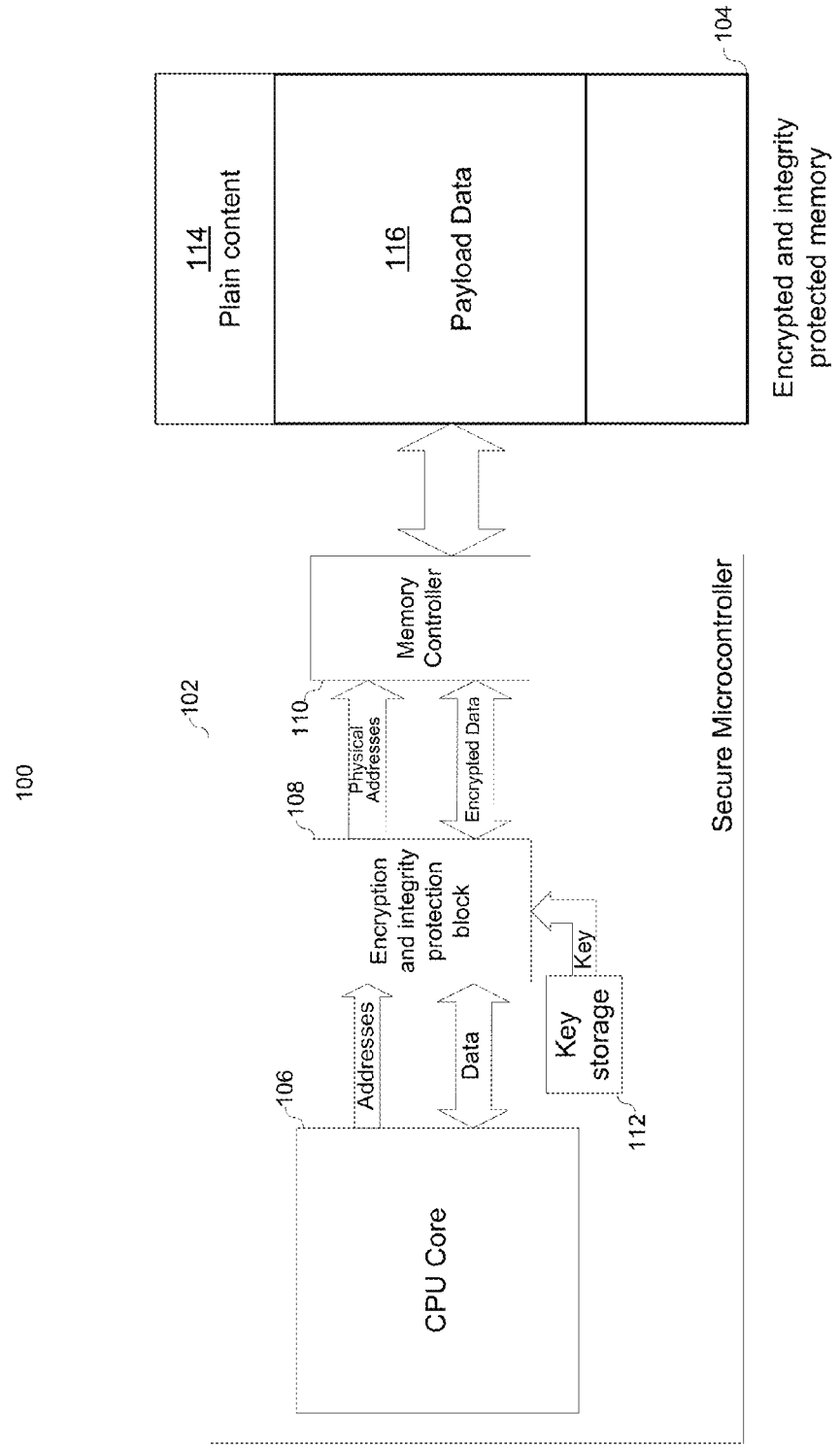
Figure 2:
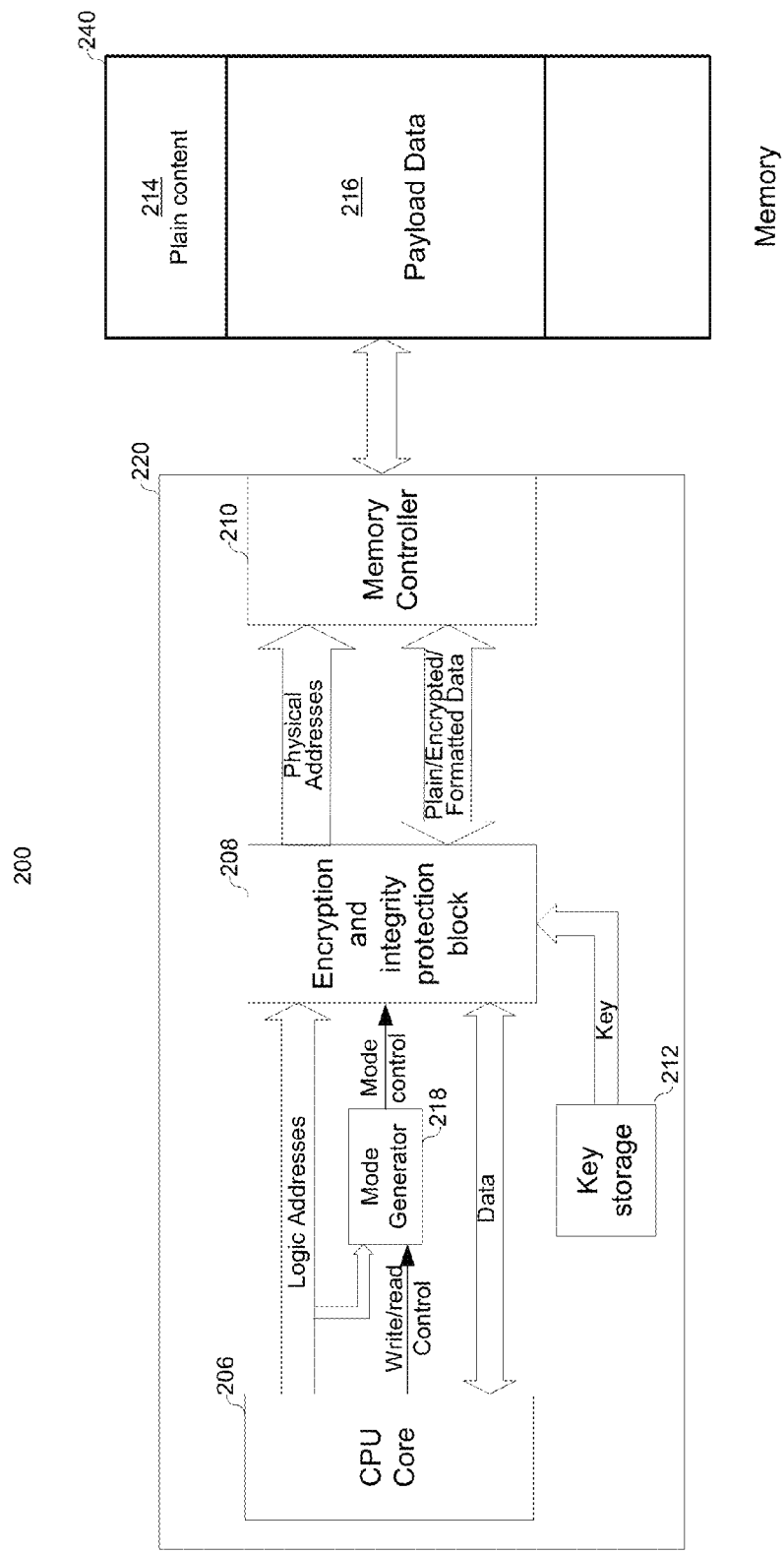
FIG. 2 illustrates a block diagram of a secure microcontroller system comprising a secure microcontroller interfacing with a memory according to various embodiments of the invention.

FIG. 2 illustrates a block diagram 200 of a secure microcontroller system comprising a secure microcontroller 220 interfacing with a memory 240 according to various embodiments of the invention. The secure microcontroller 220 comprises a CPU core 206, an encryption and integrity protection block 208, a memory controller 210, a key storage 212 and buses for data, addresses and keys. In the present invention, the secure microcontroller 220 further comprises a mode generator 218. The mode generator 218 is coupled to receive a logic address and a write/read control, and generates a mode control signal that is used to determine a data processing method according to a specific data processing mode. The logic address is a relative address of data within a data block.

The memory 240 that interfaces with the secure microcontroller 220 may comprise various external memories including random access memory (RAM), read only memory (ROM), and flash memory. The memory 240 may be partitioned to store plain content 214, and payload data region 216. The payload data normally comprises data headers/trailers and processed data that are encrypted or formatted data associated with confidential information (e.g., user names, passwords, transactions, programs, etc.). A physical address is used to identify a location within the memory 240.

During a memory write cycle, input data is preprocessed prior to being transmitted to and stored in the memory 240. The CPU core 206 generates the input data, a logic address and a write/read control. The write/read control is used to determine a mode control signal. The encryption and integrity protection block 208 is coupled to receive the input data, the logic address, and the mode control signal. The mode control signal is associated with a data processing mode. The block 208 further processes the data and generates payload data (i.e., processed data) based on at least one data processing method. The data processing method is selected from a plurality of data processing methods based on the data processing mode. In addition, the block 208 also translates the logic address to at least one physical address for storing the payload data. The memory controller 210 stores the payload data as specified in the physical address in the memory 240.

During a memory read cycle, payload data (i.e., input data) is post-processed after being extracted from the memory 240. A logic address is provided by the CPU core 206 to select specific payload data being extracted from the memory 240. The encryption and integrity protection block 208 translates the logic address to at least one physical address. A data processing mode is indicated by a mode control signal generated by the mode generator 218. The memory controller 210 enables the access to the memory contents in the physical address where the payload data is extracted. At least one data processing method is selected from a plurality of data processing methods to attain processed data based on the data processing mode. The data processing method used for memory read may be reverse to the data processing method employed to pre-process the data for memory write. As a result, the processed data may be used for a subsequent data processing, and in particular, for verifying the payload data.

More than one data processing method may be implemented in the encryption and integrity protection block 208 in one data processing mode. In certain embodiments for a memory write operation, the input data is processed by a plurality of data processing methods to generate a plurality of payload data (i.e., processed data), and the associated logic address is also to a plurality of physical addresses for storing the plurality of payload data, respectively. In one particular embodiment, input data may not only be encrypted to generate encrypted payload data based on a data encryption method, but also be employed to generate integrity control data based on an integrity check method. The processed data (encrypted payload data and integrity control data) are stored in respective physical addresses.

In certain embodiments for a memory read operation, at least one input data (i.e., payload data) is extracted from the memory 240 according to at least one physical address translated from a logic address. The input data are processed by at least one data processing method for various purposes. In one particular embodiment, the input data includes encrypted data and integrity control data. The encrypted data may be decrypted to generate processed data based on a data decryption method, while the integrity control data are used to verify data integrity between the processed data and original data based on an integrity check method.

The memory 240 is partitioned to a plain content region 214 and a payload data region 216. The payload data region 216 is used to store encrypted or formatted data. In the present invention, the payload data region 216 may be further partitioned to various regions where each region is associated with a data format. Therefore, data in different regions are encrypted or formatted differently according to their respective encryption or formatting methods. For each data processing mode, a logic address may be translated to physical addresses corresponding to various regions, and corresponding data processing methods are selected to process the input data in accordance.

Figure 3:
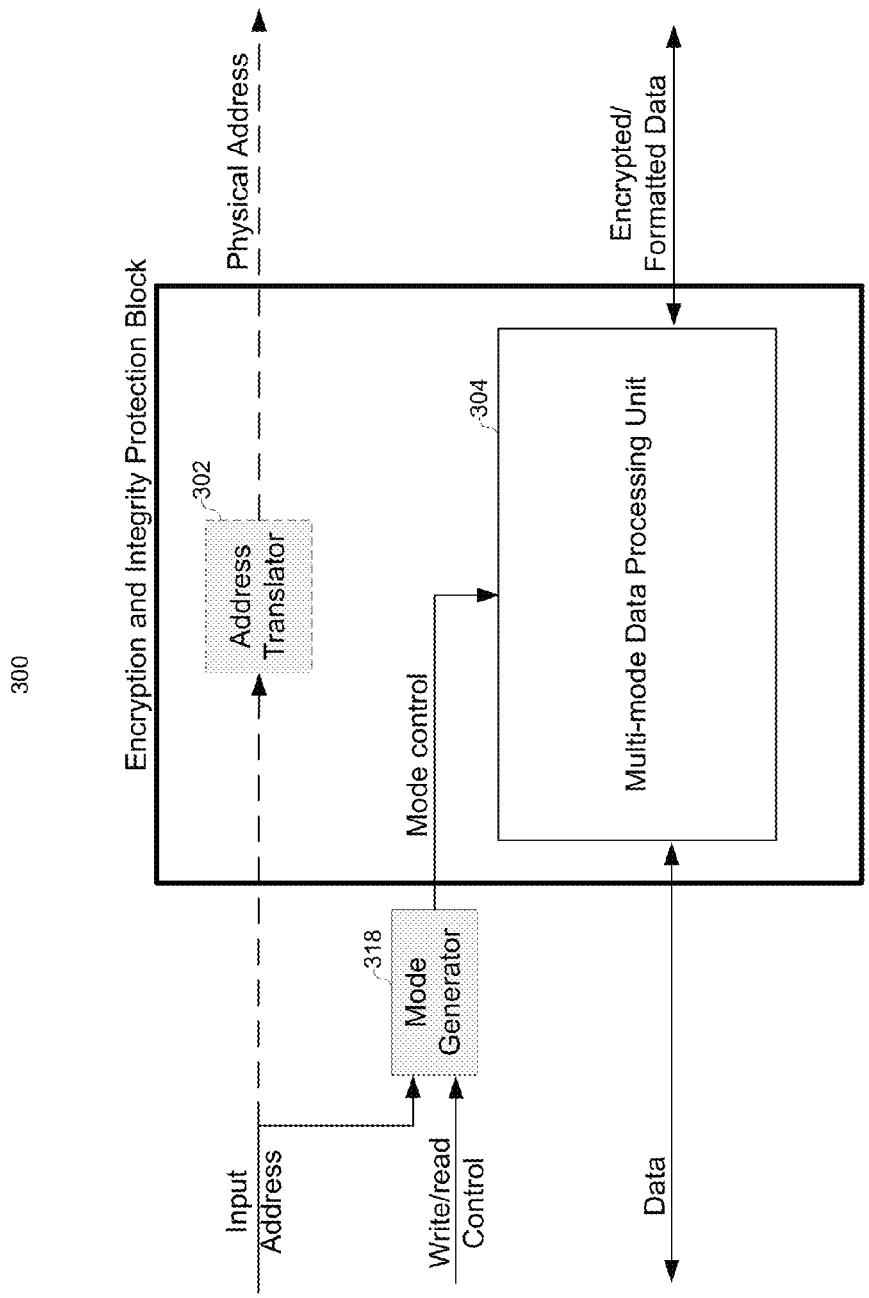
FIG. 3 illustrates a block diagram of a mode-based data processing system at a microcontroller interface according to various embodiments of the invention.

FIG. 3 illustrated a block diagram 300 of a mode-based data processing system at a microcontroller interface according to various embodiments of the invention. The mode-based data processing system 300 is coupled to receive a logic address, a write/read control and input data. In accordance with the write/read control, input data may be data from a host side (e.g., the CPU core 206) or payload data from an interface side (e.g., the memory 240). The system 300 comprises of a mode generator 318, an address translator 302, and a multi-mode data processing unit 304. The address translator directly translates the logic address to at least one physical address. The mode generator determines a data processing mode, and generates a mode control signal according to the logic address and the write/read control. The mode control signal is further used by the multi-mode data processing unit 304 to generate processed data according to at least one data processing method. In certain embodiment, one data processing mode may relate to more than one data processing method, and result in more than one processed data and more than one physical address. Therefore, the data path is programmed according to the data processing mode at the interface of the microcontroller to the memory.

The mode control signal includes multiple bits, and is associated with a plurality of data processing modes. The mode control signal is derived mainly from the input logic address in the mode generator 318, while the write/read control is used to differentiate whether a memory write or read operation is involved. In particular, during the memory write or read processes, the mode control signal configures the multi-mode data processing unit to encrypt/format the data from the host side or to decrypt/reformat the encrypted/formatted payload data from the interface side, respectively. Hence, the mode control signal generated by the mode generator 318 effectively selects a data path which can be either direction between the host side and the interface side.

The data path between the host side and the interface side is programmed according to the data processing mode. A data stream may comprise a sequence of input data associated with different data processing modes, and therefore, input data in the sequence may be associated with different data paths. Data security is enhanced for the data stream due to such a programmable data path. In various embodiments of the present invention, the mode generator 318 and the multi-mode data processing unit 304 are the hardware dedicated to introduce this programmable data path as a data security feature.

Figure 4:
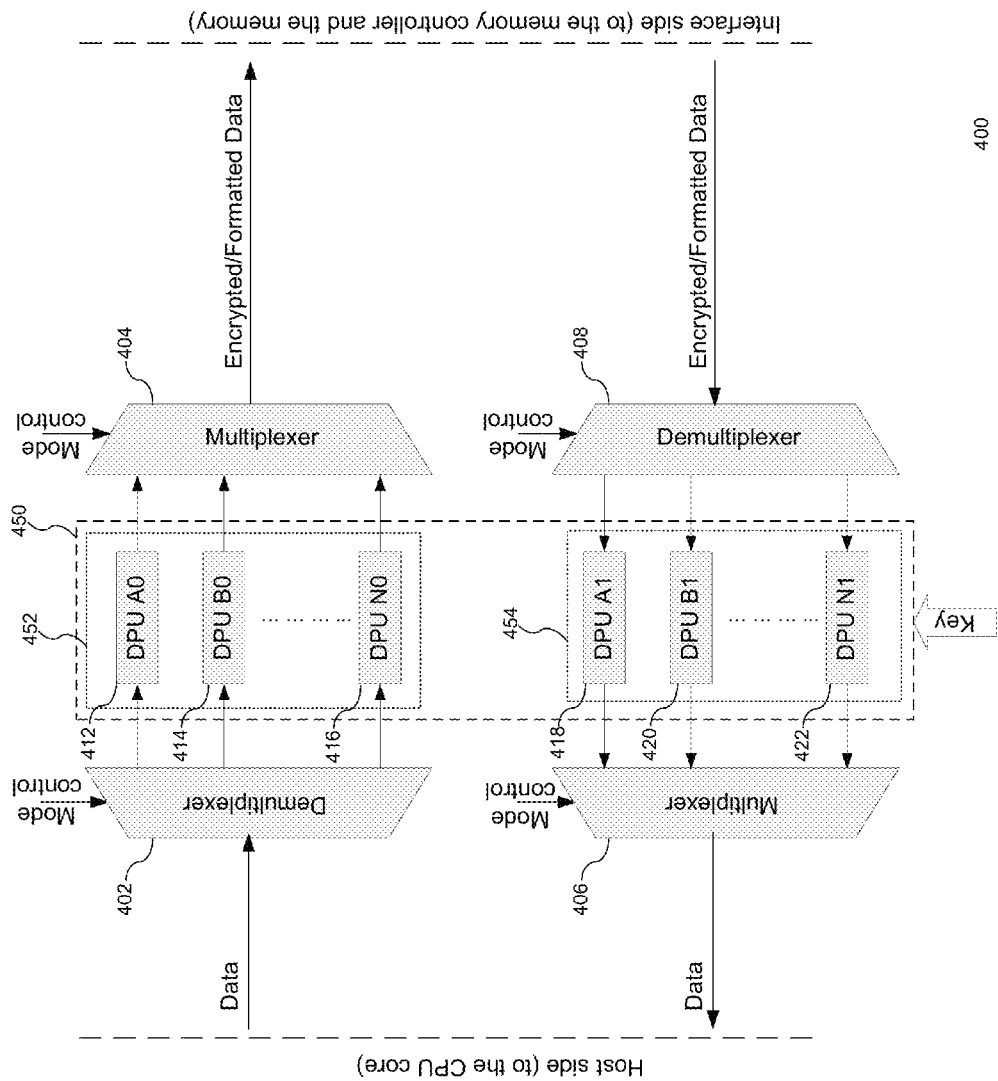
FIG. 4 illustrates a block diagram of a multi-mode data processing unit according to various embodiments of the invention.

FIG. 4 illustrated a block diagram 400 of a multi-mode data processing unit according to various embodiments of the invention. The multi-mode data processing unit 400 is coupled to receive a mode control signal and input data. In accordance with the write/read control, input data may be data from a host side (e.g., the CPU core 206) or payload data from an interface side (e.g., the memory 240). The multi-mode data processing unit 400 comprises a first demultiplexer 402, a first multiplexer 404, a second multiplexer 406, a second demultiplexer 408 and a plurality of data processing units 450. The plurality of data processing units 450 are grouped to two sets 452 and 454. The set 452 comprise data processing units 412, 414 and 416 which are employed with the first demultiplexer 402 and multiplexer 404 to process (e.g., encrypt, format) input data to payload data during memory write cycles. The set 454 comprises data processing units 418, 420 and 422 which are employed with the second multiplexer 406 and demultiplexer 408 to process the input data and provide processed data to the CPU core 202 during memory read cycles. When a first data processing unit in the set 452 is used for encrypting or formatting input data to payload data, a second corresponding data processing unit in the set 454 may be used for decrypting or re-formatting the payload data to respective original data. The respective data processing methods employed in the first and second data processing units are reverse to each other.

During a memory write cycle, the demultiplexer 402 provides the input data to at least one of the plurality of data processing units (DPU) 412, 414 and 416. The data processing unit generates processed data (i.e., encrypted or formatted payload data), at least one of which is selected by the multiplexer 404 as an output to the memory controller 210. During a memory read cycle, the demultiplexer 408 is coupled to receive a plurality of input data (i.e., encrypted/formatted payload data) stored in the memory, and provide the payload data to at least one of the plurality of data processing units 418, 420 and 422. The data processing unit decrypts the payload data to processed data, and at least one of the processed data is selected by the multiplexer 406 as an output to the CPU core 202. The multiplexers 404, 406 and demultiplexers 402, 408 are all controlled by a mode control signal.

In one embodiment, the data processing unit is based on a bypass method where a direct data path is formed between the CPU core 202 and the memory 240. Input data of its original format (i.e., in plain text) are directly stored in or retrieved from the memory.

In one embodiment, the data processing unit simply configures the format of input data according to their addresses and the write/read mode, while another reverse data processing unit may recover formatted data to its original format during a memory read cycle.

In one embodiment, the data processing unit encrypts input data to payload data using a data encryption method based on a key, a logic address or the write/read mode. A reverse data processing unit may also exist to decrypt the payload data using a data decryption method based on the key, the logic address or the write/read mode. Although proprietary data encryption/decryption methods may be applied, a standard cyclic redundancy check (CRC) method may be conveniently used to encrypt/decrypt the data, but the attacker can easily reverse the encryption/decryption process, and high-level security may not be provided by a CRC method.

In one embodiment, an integrity check method is employed in a data processing unit to generate integrity control data which are subsequently stored in the memory identified by a physical address. Several integrity check methods may be employed. The simplest method is 1-bit even/odd parity check, wherein one integrity control bit is generated to maintain an even or odd parity among all the bits in the data. Alternative integrity check methods ranges from a simple cycling redundant check (CRC) which has low security resistance to strong and proven methods, such as message authentication code (MAC).

In certain embodiments, two data processing units may be involved in a data processing mode enabled by the mode control signal. The resulting data may be in two formats stored in two different memory regions. In particular, during memory write cycles, integrity control data are commonly generated in company with the payload data which may be identical to, formatted from, or encrypted from the original input data. The payload data and integrity control data are generated by a first data processing unit and a second data processing unit, respectively. During a memory read cycle, the payload data that may be original, formatted or encrypted are recovered to the original data in a third data processing unit, and validity of the recovered data is checked based on the integrity control data in a fourth data processing unit. The first and third data processing units are reverse to each other, while in the fourth data processing unit, the recovered original data may be used to regenerate integrity control data for comparison with the integrity control data extracted from the memory, and the integrity control data extracted from the memory may also undergo certain processing to verify data validity. Two data processing units are involved to generate two results for each data processing mode corresponding to a memory read or write operation.

In another particular embodiment, data need to be stored in the memory 240 in two forms, plain text and an encrypted form. A first data processing unit comprising a bypass bus is employed to allow data storage in plain text in a first memory region, and a second data processing unit implementing a data encryption method is also enabled to generate payload data in the encrypted form for storing in a second memory region. Parallel data processing is implemented by the multi-mode data processing unit 400 to avoid software data processing or complicated data path reconfiguration to switch between data processing. [0001]

A physical address may be associated with more than one logical address, and thus, different data processing methods are applicable to the content at the physical address. In certain embodiments, the data processing unit encrypts input data to payload data at a physical address using a data encryption method based on a key and a logic address. During a memory read cycle, the same logic address may be used to extract and recover the input data using a data decryption method based on the same key, while a different logic address may also be applied to read back this data using a plain text mode. Therefore, regardless of its original data form, use of various logic addresses allows a data stored at a physical address to be extracted to different data forms during a memory read cycle.

Figure 5:
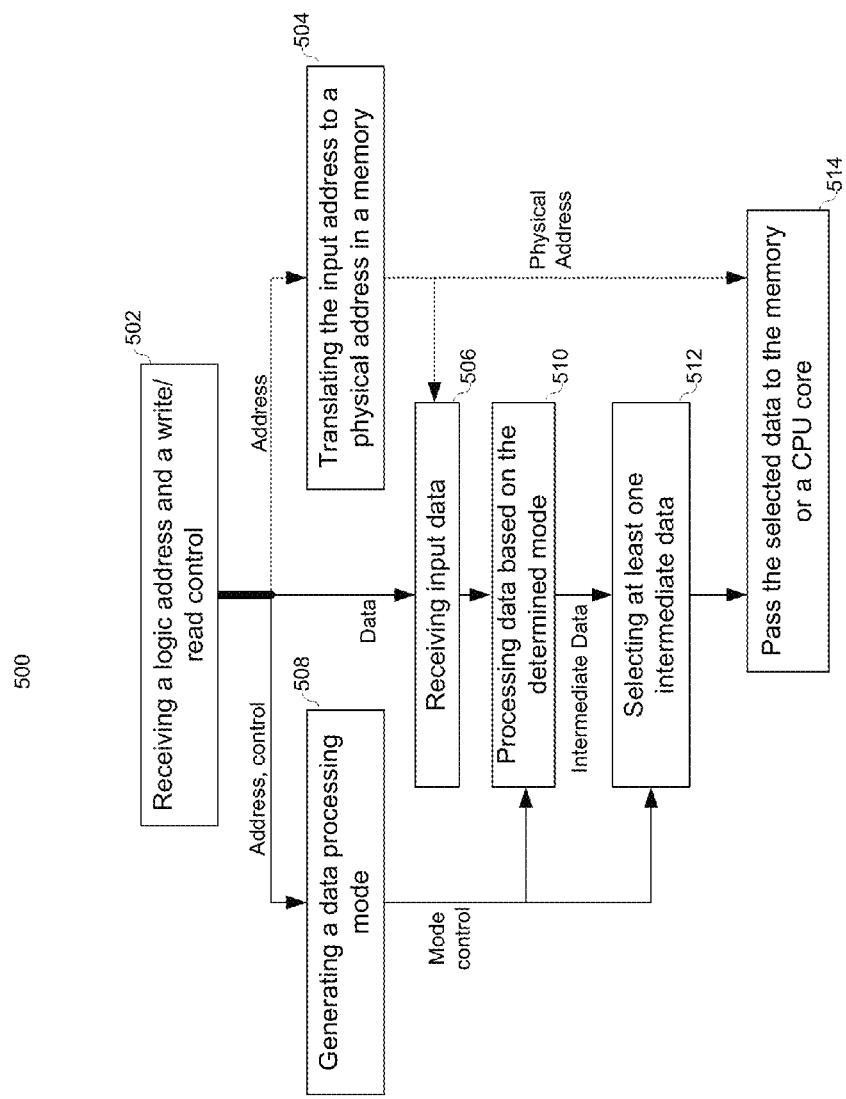
FIG. 5 illustrates a method of implementing mode-based data processing in a microcontroller according to various embodiments of the invention.

FIG. 5 illustrates a method 500 of implementing mode-based data processing in a microcontroller according to various embodiments of the invention. A logic address and a write/read control are received at step 502. The write/read control is used to specify whether this is a memory write or read process. The logic address identifies the relative location of the input data within a data block. In both the memory write and read process, the logic address is translated to at least one physical address in the memory at step 504.

Input data is received at step 506. The input data may be either be data from a host side (e.g., the CPU core 206) or encrypted/formatted data from an interface side (e.g., the memory 240). For memory write, input data are first processed and then stored in the memory according to the physical address, while for memory read, input data are the payload data first extracted from the physical address and then processed in the subsequent steps.

At step 508, the input address and the write/read control are employed to generate a mode control signal that specifies one data processing mode for subsequent data processing. The input data are processed by at least one data processing mode determined by the mode control signal at step 508. In various embodiments, the input data may be directly transferred, encrypted, formatted, decrypted, or reversely formatted to result in processed data according to the data processing mode. At least one of the processed data is selected for output at step 512. In a subsequent step 514, the processed data selected for output is passed to the memory 240 in a memory write operation or to the CPU core 206 in a memory read operation, respectively.

One skilled in the art will recognize that this mode-based data processing system or device is a dedicated hardware unit that may effectively avoid complex software programs otherwise needed. The data processing rate and the throughput capacity of the microcontroller are enhanced as well.

One skilled in the art will also recognize that such mode-based data processing is applicable to configure a memory functioning as an input/output register at the interface of a secure microcontroller to an external component. A data stream is formatted or encrypted prior to being transmitted from the secure microcontroller to the external component. In one embodiment, data packets from a secure microcontroller are processed and stored in the memory for transmission via an Ethernet network, and various data processing modes may be used according to the field of the data packets. Such mode-based data processing allows the Ethernet network to gain a benefit of on-the-fly encryption/encoding/formatting, and the data throughput is enhanced.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A machine-implemented method of storing data in a memory interfacing with a secure microcontroller, the method comprising:

generating a logic address, input data and a write/read control in the microcontroller, the write/read control identifying a memory read or write operation;

translating the logic address to at least one physical address in the memory that is partitioned into a plurality of regions;

generating a mode control signal based on the logic address and the write/read control, the mode control signal identifying a data processing mode from a plurality of data processing modes;

associating the data processing mode with at least one data processing method selected from a plurality of data processing methods, each data processing method being associated with at least one region of the memory;

storing data within the at least one region of the memory according to the selected at least one data processing method; and wherein one of the plurality of data processing modes involves two data processing methods, such that two processed data are generated, and a first logic address is translated into a first physical address and a second logic address is translated into a second physical address, the first and second physical addresses are located within different regions in the memory.

2. The method of storing data in a memory interfacing with a secure microcontroller in claim 1, wherein the plurality of data processing methods comprises a bypass method bypassing the input data, and processed data are in plain text identical to the input data.

3. The method of storing data in a memory interfacing with a secure microcontroller in claim 1, wherein the plurality of data processing methods comprises at least one integrity check method used to generate integrity control data corresponding to the input data.

4. The method of storing data in a memory interfacing with a secure microcontroller in claim 1, wherein the plurality of data processing methods comprises at least one formatting method used to vary the format of the input data for storing in the memory.

5. The method of storing data in a memory interfacing with a secure microcontroller in claim 1, wherein the plurality of data processing methods comprises at least one data encryption method used to encrypt the input data.

6. The method of storing data in a memory interfacing with a secure microcontroller in claim 1, where the at least one encryption method is based on a key extracted from a key storage.

7. The method of storing data in a memory interfacing with a secure microcontroller in claim 1, wherein at least one of the plurality of data processing methods is proprietary.

8. The method of storing data in a memory interfacing with a secure microcontroller in claim 1, wherein the two data processing methods include a bypass method and a data encryption method, respectively, such that the two processed data are in plain text and in an encrypted format, respectively.

9. The method of storing data in a memory interfacing with a secure microcontroller in claim 1, wherein the two data processing methods are a data encryption method and an integrity check method, respectively, such that the two processed data are an encrypted data and an integrity control data, respectively.

10. A mode-based microcontroller, comprising:

an address translator, coupled to receive an input address, the address translator translates the input address to at least one physical address in an external memory that interfaces to the microcontroller;

a mode generator, coupled to receive the input address and a write/read control, the mode generator generates a mode control signal that identifies one data processing mode from a plurality of data processing modes according to the write/read control and the input address;

a multi-mode data processor having hardware, coupled to receive the mode control signal and input data, the multi-mode data processing unit generates at least one processed data based on at least one of a plurality of data processing methods that are identified according to the data processing mode; and wherein the external memory is partitioned to a plurality of regions, and each of the plurality of data processing methods is associated with one of the plurality of regions in the external memory, one of the plurality of data processing modes involves two data processing methods, such that two processed data are generated, and a first logic address is translated into a first physical address and a second logic address is translated into a second physical address, the first and second physical addresses are located within different regions in the memory.

11. The mode-based microcontroller in claim 10, wherein when the write/read control identifies a memory read operation, the input data are read from at least one of the plurality of regions in the external memory, and when the write/read control identifies a memory write operation, the at least one processed data is stored in at least one region selected from the plurality of regions in the external memory.

12. The mode-based microcontroller in claim 10, wherein in one data processing mode, the multi-mode data processor generates two processed data from the input data, and the two processed data are encrypted and plain text, respectively, for storing in two different regions of the plurality of regions in the external memory.

13. The mode-based microcontroller in claim 10, wherein in one data processing mode, the multi-mode data processor generates two processed data from the input data, and the two processed data are encrypted data and integrity control data, respectively, for storing within two different regions of the plurality of regions in the external memory.

14. The mode-based microcontroller in claim 10, wherein the multi-mode data processor further comprises:

a first demultiplexer that passes the input data according to the data processing mode during a memory write operation;

a second demultiplexer, coupled to the external memory, the demultiplexer passes the input data according to the data processing mode during a memory read operation;

a plurality of data processing units, coupled to the first and second demultiplexers, the plurality of data processing units generates a plurality of processed data according to a plurality of data processing methods, wherein each data processing unit is associated with one data processing method;

a first multiplexer, coupled to the external memory, the first multiplexer selects at least one of the plurality of processed data according to the data processing mode during the memory write operation; and a second multiplexer that selects at least one of the plurality of processed data according to the data processing mode during the memory read operation.

15. The mode-based microcontroller in claim 14, wherein one data processor in the multi-mode data processing unit bypasses the input data and generates processed data that are in plain text identical to the input data.

16. The mode-based microcontroller in claim 14, wherein two data processors are included in the multi-mode data processor for two reverse processes of data encryption or data decryption, respectively, and these two reverse processes are respectively employed to encrypt the input data when the input data are provided by the microcontroller for storing in the external memory, and to decrypt the input data when the input data are extracted in an encrypted format from the external memory.

17. A multi-mode data processing unit at an interface of a microcontroller, comprising:
   a first demultiplexer that passes input data according to a data processing mode during a memory write operation;
   a second demultiplexer, coupled to an external memory, the demultiplexer passes the input data according to the data processing mode during a memory read operation;
   a plurality of data processing units having hardware, coupled to the first and second demultiplexers, the plurality of data processing units generates a plurality of processed data according to a plurality of data processing methods, wherein each data processing unit is associated with one data processing method;
   a first multiplexer, coupled to the external memory, the first multiplexer selects at least one of the plurality of processed data according to the data processing mode during the memory write operation; and
   a second multiplexer that selects at least one of the plurality of processed data according to the data processing mode during the memory read operation;
   wherein the external memory is partitioned to a plurality of regions, and processed data generated by one of the plurality of data processing methods are associated with one of the plurality of regions in the external memory.

18. The multi-mode data processing unit in claim 17, wherein a data processing unit in the plurality of data processing units bypasses the input data and generates processed data that are in plain text identical to the input data.

19. The multi-mode data processing unit in claim 17, wherein two data processing units in the plurality of data processing units are included for two reverse processes of data encryption or data decryption, respectively, and these two reverse processes are respectively employed to encrypt the input data when the input data are provided by the microcontroller for storing in the external memory, and to decrypt the input data when the input data are extracted in an encrypted format from the external memory.

20. The multi-mode data processing unit in claim 17, wherein a data processing unit in the plurality of data processing units generates integrity control data according to an integrity check method during a memory write operation.

* * * * *